Patented Oct. 31, 1950

2,528,445

UNITED STATES PATENT OFFICE 2,528,445

DIVINYL TETRACHLOROBENZENES AND POLYMERS THEREOF

Moushy Markarian, North Adams, Mass., assignor to Sprague Electric Company, North Adams, Mass., a corporation of Massachusetts No Drawing. Application August 17, 1948, Serial No. 44,795

7 Claims. (Cl. 260—87.5)

The present invention relates to new polymerizable divinyl aromatic compounds and more specifically refers to monomers, polymers and copolymers of divinyl tetrachlorobenzenes. This application is a continuation-in-part of the United States patent application Serial No. 720,309, filed on January 4, 1947, by the same inventor.

The divinyl benzenes are well-known bi-functional monomers and have been used as a cross-linking ingredient in polymerizable systems, particularly to raise the softening point, solvent resistance and the like of other polymers. For such purposes they are more or less satisfactory. Unfortunately, however, the divinyl benzene monomers are relatively low melting materials. As a result, it is difficult to preserve them at room temperature for future use without polymerization thereof. Partial polymerization (homopolymerization) of these divinyl compounds is undesirable, since it greatly reduces their effectiveness for the above-mentioned purposes and the uniformity of the results obtained therewith. In addition to their instability at normal temperatures, the divinyl benzenes are flammable and relatively low boiling, thus reducing their utility at elevated temperates and at reduced pressures. When large amounts of divinyl benzene are stored in a container, polymerization will be accompanied by heat which will not easily be dissipated. This heat, in turn, accelerates the polymerization. As a result, extreme temperatures will develop in the center of the mass and explosion and/or fire may ensue. Further it is extremely difficult to isolate the pure divinyl benzene monomers. Ordinarily the monomers are produced as mixtures with ethyl vinyl benzene and with diethyl benzene. The latter compound is particularly undesirable, having a low boiling point and making little or no contribution as a plasticizer in a polymerization system.

It is an object of the present invention to overcome the foregoing and related disadvantages of the divinyl benzenes. A further object is to produce new and valuable, polymerizable divinyl compounds. A still further object is to produce resins having excellent flame resistance, temperature resistance and solvent resistance. Additional objects will become apparent from the following description of the invention.

In my parent application, I have disclosed divinyl tetrachlorobenzenes, particularly for use as cross linking copolymerizable monomers with pentachlorostyrene. These divinyl compounds with which the present invention is particularly concerned are the para-, ortho- and meta-isomers of divinyltetrachlorobenzene. The preferred monomer is the paradivinyl tetrachlorobenzene which is a crystalline solid having a melting point of about 86° C. The divinyl tetrachlorobenzene monomers are very stable at normal temperatures and, at the same time, very useful in polymerization systems, either as homopolymer materials or as cross-linking materials for other monomers and mixtures thereof. These monomers are not flammable, are stable to polymerization at room temperature and may be readily prepared in substantially pure form in good yield by syntheses which are described in later paragraphs. Their homopolymers are hard, non-flammable, infusible resins, while their copolymers have improved properties over those of the polymers of their comonomers, the improvement being substantial, even in polymer systems containing only small proportions of these divinyl compounds. Furthermore, the electrical properties of the materials of the invention are outstanding.

The bi-functional divinyl tetrachlorobenzene monomers may be copolymerized with a host of other polymerizable monomeric materials. Where it is desired to obtain elastomeric polymers, the divinyl compounds are copolymerized with conjugated dienes, representative of which are butadiene-1,3; piperylene; 1,2-dimethyl-butadiene-1,3; 2,3-dimethyl-butadiene-1,3; 1,3-dimethyl butadiene-1,3; isoprene; and various halogenated derivatives of these compounds. In many cases, I employ multicomponent systems including a divinyl compound of the invention, a conjugated diene and another polymerizable compound such as styrene, acrylonitrile etc. The copolymerization with the above compounds is generally carried out in an emulsion with water or other suitable emulsion medium. It has been noted that elastomeric copolymers, which preferably contain from about .01% to about 5% of the divinyl compound, are more solvent resistant, more stable in processing, exhibit less shrinkage after milling etc. than polymers not containing the cross-linking agent.

Aromatic and aliphatic compounds having a $CH_2=C<$ group may be copolymerized with the bi-functional monomers of the invention. Representative compounds of this category are ethylene and substituted derivatives thereof, such as vinyl chloride and vinyl fluoride; olefins such as isobutylene, and isoamylene; vinyl acetate; acrylic acid and esters of acrylic acid, methacrylic acid and its esters; styrene and substituted derivatives thereof, such as alpha-methyl styrene, p-ethyl styrene, ring substituted chloro-styrenes, (o-chlorostyrene, 2,5-dichlorostyrene, pentachlorostyrene, etc.) methoxystyrene and the like; N-vinyl pyrroles, such as N-vinyl carbazole; vinyl ethers, such as butyl vinyl ether; vinyl thioethers, such as vinyl ethyl thioether; vinyl ketones such as methyl vinyl ketone; vinyl furans; vinyl dibenzofurans; vinyl diphenyl ethers; vinyl diphenyl sulfide; 2-vinyl thiazole and its homologues; vinyl thiophene; vinyl pyridine; vinyl pyrrolidone; allyl acetate and other aliphatic and aromatic allyl compounds and allyl esters.

The bi-functional monomers of the invention may be incorporated with unsaturated alkyd resins, tung oil compositions, styrenated drying oils etc. to increase the toughness and other properties of coatings prepared therefrom.

The following examples will serve to illustrate the preparation, homopolymerization and copolymerization of the compounds of the invention.

EXAMPLE 1

*Preparation of para-diethyl tetrachlorobenzene*

134.2 grams of para-diethyl benzene and 1 gram of iron powder were placed in a 500 cc. 3-necked flask equipped with a chlorine sparger, a thermometer and reflux condenser. Chlorine was run into the mixture while excluding light, until a gain in weight of 137.8 grams was reached. The temperature of the reaction mixture was maintained below 40° C. during the chlorination, until the reaction was 15 grams short of the theoretical gain in weight. At this time the temperature was raised to 60° C., in order to keep the reaction product liquid, and the chlorination was completed. The product was dissolved in benzene, and the solution was washed twice with an aqueous caustic soda solution, washed twice with water and dried over magnesium sulfate. The dehydrating agent was then filtrated off, and the benzene was removed by distillation to leave 257 grams of a light tan, crystalline residue. The melting point of this crude product was 62–67° C. Fractional distillation of the crude product gave 215 grams of oily, white crystals. Upon recrystallization from methanol, the melting point was raised to 69–71° C. One more recrystallization from methanol brought the melting point up to 71–72° C.

EXAMPLE 2

*Preparation of para-diethyl tetrachlorobenzene dibromide*

136 grams of the diethyl tetrachlorobenzene produced as described in Example 1 were heated to melting in a glass flask provided with an external 500-watt light source. 160 grams of bromine were added to the melt over a period of two days, the temperature of the reaction being maintained between 90 and 110° C. Recrystallization from a mixture of acetone and water gave a product with a melting point of 120–122° C. Repeated recrystallizations from the same solvent brought the melting point up to 134–135° C.

| Analytical Data | Percent C | Percent H |
|---|---|---|
| Calculated | 27.97 | 1.86 |
| Observed | 27.95 | 1.74 |
| Do | 27.78 | 1.90 |

EXAMPLE 3

*Preparation of para-divinyl tetrachlorobenzene*

21.5 grams of the para-diethyl tetrachlorobenzene dibromide produced as described in Example 2 were refluxed for two hours with 11.2 grams of potassium hydroxide and 150 cc. of ethyl alcohol. At the end of this time water was added to precipitate the organic material, and the latter was removed by filtration. The filter cake material upon drying had a melting point of 76–81° C., 13.5 grams thereof being obtained. Recrystallization from methanol raised the melting point of the para-divinyl tetrachlorobenzene to 86–87° C.

| Analytical Data | Percent C | Percent H |
|---|---|---|
| Calculated | 44.85 | 2.26 |
| Observed | 45.06 | 2.47 |
| Do | 45.20 | 2.41 |

The preparation of meta-divinyl tetrachlorobenzene and ortho-divinyl tetrachlorobenzene may be carried out in the same manner, starting, of course, with meta-diethyl benzene and ortho-diethyl benzene, respectively. The dehydrobromination may also be accomplished in good yield by passing the dibromide over activated alumina with steam at a temperature of about 450° C. In addition to the above syntheses, the monomeric compounds may be obtained by dehydrochlorination of beta, beta[1]-and alpha, -alpha[1]-dichloro diethyl tetrachlorobenzenes, by dehydration of alpha, alpha[1]- and beta, beta[1]-dihydroxy diethyl tetrachlorobenzenes, by dehydrogenation of diethyl tetrachlorobenzenes and pyrolysis of bis-alpha-acetoxyethyl tetrachlorobenzene.

Homopolymerization of the monomers may be accomplished simply by heating them above their melting points. While the reaction is fairly rapid, it may be accelerated by the use of peroxide or acid catalysts. Copolymerization with other materials is likewise fairly rapid, but may be catalysed with acidic and peroxide catalysts, if so desired. For electrical applications, it is generally desirable to conduct the polymerization with heat alone, as the added catalytic material may deleteriously affect the electrical properties, particularly resistivity and power factor, of the resultant polymer.

EXAMPLE 4

A number of homo- and copolymerizations were carried out, as indicated in the table below. The temperature was maintained 155° C. The appearance at 155° C. after ½ hour and 1½ hours is noted, as well as the room temperature appearance after 65 hours at 155° C. All samples were sealed in glass tubes for the test.

*Polymerization table*

| Sample | Appearance at 155° C. | | |
|---|---|---|---|
| | ½ hour | 1½ hours | 65 hours |
| A. 100% DTB [1] | non-flowing | solid, clear | clear, solid. |
| B. 50% styrene, 50% DTB | do | solid | Do. |
| C. 99% styrene, 1% DTB | Very viscous | rubbery | Do. |
| D. 50% pentachlorostyrene, 50% DTB | non-flowing | clear, solid | Do. |
| E. 99% pentachlorostyrene, 1% DTB | non-flowing bubbly | bubbly, solid | bubbly, solid. |
| F. DTB plus 1% benzoyl peroxide | solid | solid | clear, solid. |
| G. DTB plus 1% oxalic acid | non-flowing | do | Do. |
| H. 50% 2,5 dichlorostyrene, 50% DTB | non-flowing bubbly | bubbly, solid | hard, bubbly solid. |

[1] DTB means p-divinyl tetrachlorobenzene.

Homopolymers and copolymers with other highly halogenated, monomeric materials results in resins which will not sustain flame and will remain hard and infusible over a wide range of temperatures. Copolymers with butadiene and other conjugated diolefins, with isobutylene, etc., wherein the amount of divinyl tetrachlorobenzene employed is usually between about 0.01% and 5%, are rubber-like materials with increased flame, solvent, oil and temperature resistance. Styrene and other aromatic monomers may be incorporated in the initial mixtures, in the usual manner. A suitable elastomeric polymer may be produced by emulsion polymerization of a mixture of 20 parts of butadiene-1,3; 5 parts of styrene; and 1 part of p-divinyl tetrachlorobenzene.

Plasticizers may be incorporated in the homopolymers and copolymers of the invention to increase their flexibility. While chlorinated plasticizers as, for example, chlorinated diphenyl, are particularly suitable for this purpose, numerous other plasticizers may be employed, such as the various phthalic acid esters, hydrogenated polyaryl compounds, high-boiling aliphatic hydrocarbons and liquid or rubbery polymers of olefins and diolefins, etc. The plasticizers may be added to the monomeric material prior to polymerization or may be incorporated into the polymers by milling, mutual solvent action, etc.

In addition to the physical and chemical stability of the polymers of the invention, the electrical properties are very satisfactory, and the use of the compounds of the invention for this purpose represents a preferred embodiment. One representative application of the materials is the impregnation of electrical condensers with monomer, followed by polymerization in situ to form an infusible assembly, useful as such or with an outer molded casing. 100% divinyl compound (molten) or a mixture of at least 5% of the divinyl compound with styrene or a substituted derivative thereof, such as pentachlorostyrene, may be used as the liquid impregnant for the condenser section. Representative of the latter is a structure consisting of two aluminum foils convolutely wound with and separated by porous paper spacing material. The pores of the paper and winding may be readily impregnated with the liquid monomers and the condenser thereafter subjected to elevated temperatures, for example, between 80° C. and 160° C. to convert the monomeric material to a hard, infusible resin. The condenser assembly thereby becomes durable, shock and flame resistant and temperature stable. The polymerization temperature will, of course, depend upon the particular monomer or monomer mixture. With 5% para-divinyl tetrachlorobenzene and 95% styrene, 100° C. is a satisfactory temperature.

Amounts between about 0.1% and about 15.0% of the divinyl compounds of the invention may be added to other polymerizable dielectric impregnants such as styrene, to increase the softening point of the polymer without adversely affecting the dielectric properties thereof. In some cases, when low concentrations of the divinyl compound are employed, particularly with low temperature polymerizations, opaque, low density polymers may be produced, overcoming difficulties which sometimes accompany large polymerization shrinkage. While I am not fully aware why the compounds of my invention possess such stability in an electric field, it may be due to the fact that halogen and hydrogen atoms do not appear on the same or adjacent carbon atoms.

The ease and rapidity of polymerization of the new compounds makes possible their use in molding powders which predominate in monomeric materials. For example, pentachlorostyrene, para-divinyl tetrachlorobenzene and an inert filler may be mixed and subjected to compression molding at a temperature above about 115° C. to form a hard polymer possessing the advantages of molded thermosetting resins without being subjected to the disadvantages thereof. The molded resin is flame-resistant, temperature stable and, if the filler is a good dielectric, possesses outstanding electrical properties. When less than about 5% of the divinyl compound is present (based upon the proportion of monofunctional compound), it is generally advisable first to polymerize the monomers and then mold the polymers in the conventional manner.

As many apparently widely different embodiments of this invention may be made without departing from the spirit and scope hereof, it is to be understood that this invention is not limited to the specific embodiments hereof except as defined in the appended claims.

I claim:

1. A divinyl tetrachlorobenzene.
2. Para-divinyl tetrachlorobenzene.
3. A resinous material comprising a copolymer of between about 0.01% and about 50% of a divinyl tetrachlorobenzene and of at least one other polymerizable compound.
4. A resinous material comprising a copolymer of between about 0.01% and about 50% of a divinyl tetrachlorobenzene and between about 99.9% and about 50% of an aromatic monovinyl compound.
5. A resinous material comprising a copolymer of about 1% para-divinyl tetrachlorobenzene and about 99% styrene.
6. A hard resinous composition comprising a homopolymer of a divinyl tetrachlorobenzene.
7. Meta-divinyl tetrachlorobenzene.

MOUSHY MARKARIAN.

REFERENCES CITED

The following references are of record in the file of this patent:

UNITED STATES PATENTS

| Number | Name | Date |
|---|---|---|
| 2,110,829 | Driesbach | Mar. 8, 1938 |
| 2,265,312 | Quattlebaum et al. | Dec. 9, 1941 |